United States Patent
Ryu et al.

(10) Patent No.: US 11,924,902 B2
(45) Date of Patent: Mar. 5, 2024

(54) DIRECTIONAL SIDELINK (SL) BEAM FAILURE DETECTION

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Jelena Damnjanovic, Del Mar, CA (US); Junyi Li, Fairless Hills, PA (US); Ling Ding, Chester, NJ (US); Juan Montojo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 17/336,118

(22) Filed: Jun. 1, 2021

(65) Prior Publication Data

US 2022/0007448 A1 Jan. 6, 2022

Related U.S. Application Data

(60) Provisional application No. 63/047,816, filed on Jul. 2, 2020.

(51) Int. Cl.
*H04W 76/18* (2018.01)
*H04L 5/00* (2006.01)
*H04W 24/04* (2009.01)

(52) U.S. Cl.
CPC ........... *H04W 76/18* (2018.02); *H04L 5/0048* (2013.01); *H04W 24/04* (2013.01)

(58) Field of Classification Search
None
See application file for complete search history.

(56) References Cited

U.S. PATENT DOCUMENTS

2019/0110281 A1 4/2019 Zhou et al.
2020/0350972 A1* 11/2020 Yi ............................. H04L 1/12
(Continued)

FOREIGN PATENT DOCUMENTS

CN 110933725 A 3/2020
WO 2020030162 A1 2/2020

OTHER PUBLICATIONS

International Search Report and Written Opinion—PCT/US2021/035533—ISA/EPO—dated Sep. 8, 2021.

Primary Examiner — Otis L Thompson, Jr.
(74) Attorney, Agent, or Firm — Arun Swain

(57) ABSTRACT

A method of wireless communication, by a first sidelink user equipment (UE), includes periodically receiving a set of sidelink beam failure detection reference signals (RSs) from a second sidelink UE. The method includes incrementing a beam failure detection (BFD) counter in response to one or more reference signals of the set of sidelink beam failure detection RSs having a received signal strength below a threshold. The first sidelink UE starts a beam failure detection timer in response to the reference signal(s) of the set of sidelink beam failure detection reference signals having the received signal strength below the threshold. Another method by a sidelink UE may periodically transmit a set of sidelink BFD RSs to another sidelink UE. The set of sidelink BFD RSs comprise one or more sidelink receive RSs. The sidelink UE configures the other sidelink UE with the sidelink receive BFD RSs.

22 Claims, 15 Drawing Sheets

(56) References Cited

U.S. PATENT DOCUMENTS

| | | | |
|---|---|---|---|
| 2021/0100059 A1* | 4/2021 | Xu | H04L 5/0048 |
| 2021/0194756 A1* | 6/2021 | Babaei | H04L 41/0654 |
| 2021/0351834 A1* | 11/2021 | Yang | H04W 16/28 |
| 2022/0095170 A1* | 3/2022 | Lindoff | H04W 24/08 |
| 2022/0173863 A1* | 6/2022 | Han | H04W 76/14 |
| 2022/0174774 A1* | 6/2022 | Tseng | H04W 76/23 |
| 2022/0255615 A1* | 8/2022 | Dutta | H04W 72/0406 |

* cited by examiner

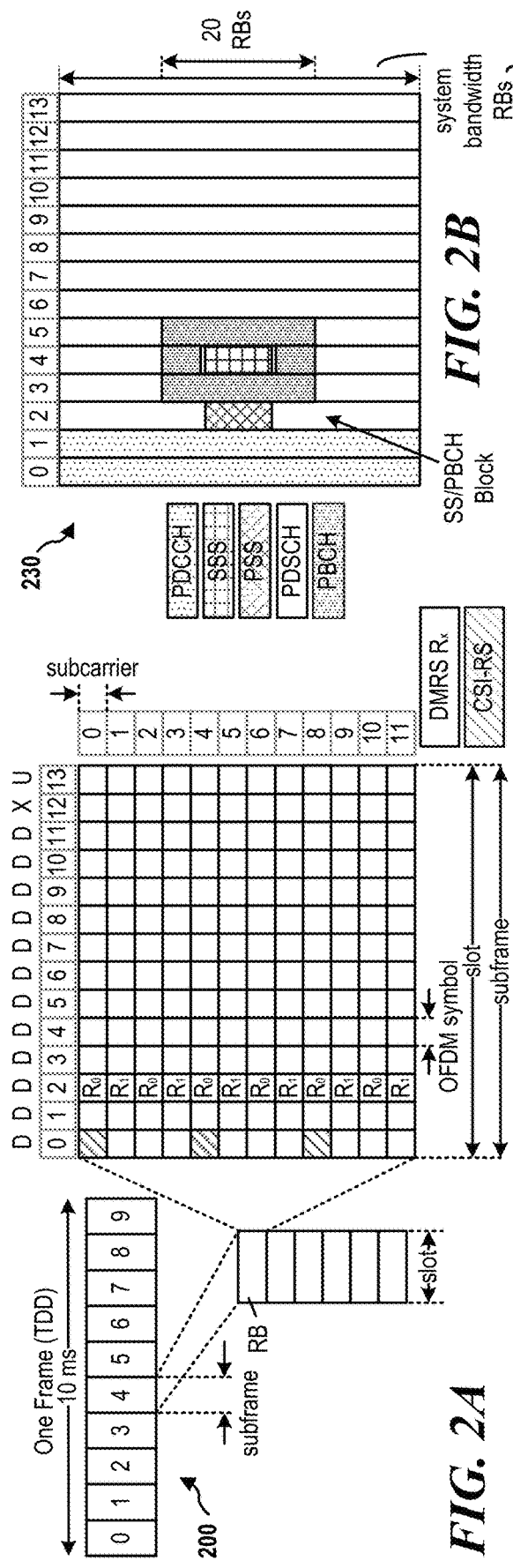
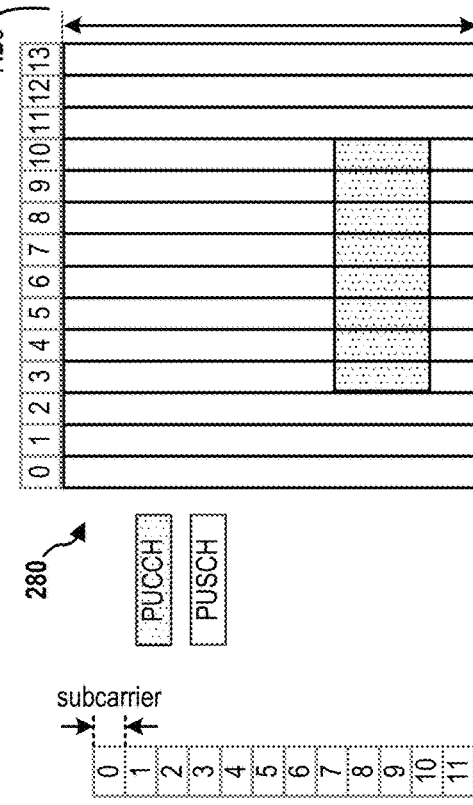
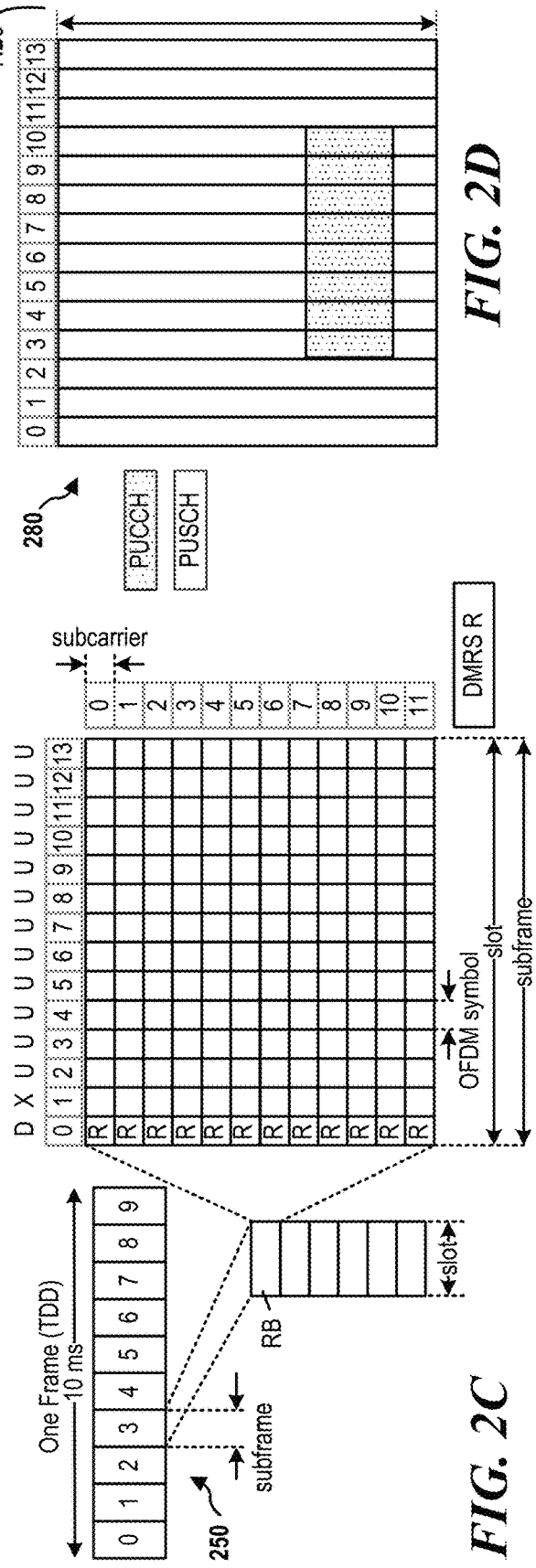

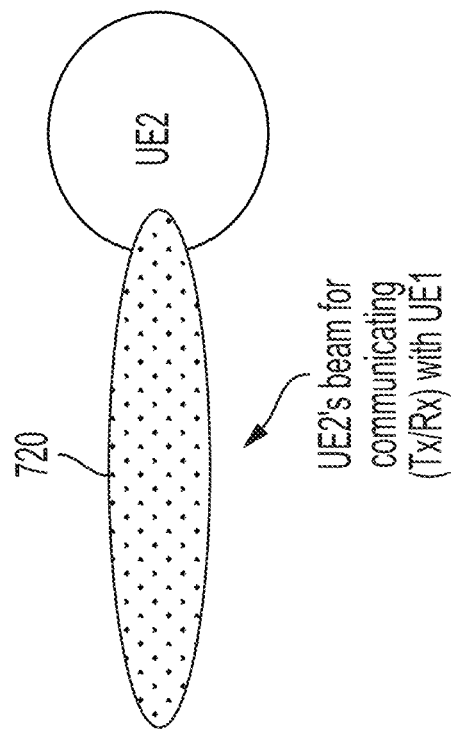
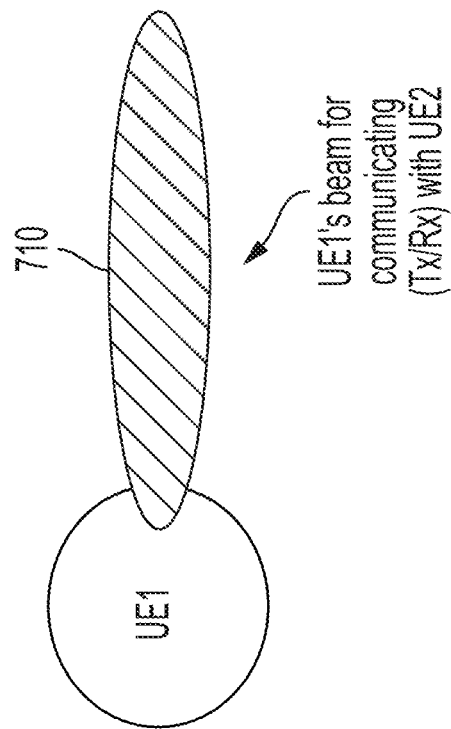
FIG. 7

DIRECTIONAL SIDELINK (SL) BEAM FAILURE DETECTION

CROSS-REFERENCE TO RELATED APPLICATION

The present application claims the benefit of U.S. Provisional Patent Application No. 63/047,816, filed on Jul. 2, 2020, and titled "DIRECTIONAL SIDELINK (SL) BEAM FAILURE DETECTION," the disclosure of which is expressly incorporated by reference in its entirety.

FIELD OF THE DISCLOSURE

Aspects of the present disclosure generally relate to wireless communications, and more particularly to techniques and apparatuses for vehicle-to-everything (V2X) directional sidelink (SL) beam failure detection.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

Wireless communications systems may include or provide support for various types of communications systems, such as vehicle related communications systems (e.g., vehicle-to-everything (V2X) communications systems). Vehicle related communications systems may be used by vehicles to increase safety and to help prevent collisions of vehicles. Information regarding inclement weather, nearby accidents, road conditions, and/or other information may be conveyed to a driver via the vehicle related communications system. In some cases, sidelink user equipments (UEs), such as vehicles, may communicate directly with each other using device-to-device (D2D) communications over a D2D wireless link. These communications can be referred to as sidelink communications.

As the demands for sidelink communications increase, different V2X communications systems compete for the same wireless communications resources. Moreover, some sidelink UEs may be power limited. Accordingly, there is a need to improve the efficiency of sidelink wireless communications.

SUMMARY

According to aspects of the present disclosure, a method of wireless communication, by a first sidelink user equipment (UE), includes periodically receiving a set of sidelink beam failure detection reference signals (RSs) from a second sidelink UE. The method includes incrementing a beam failure detection (BFD) counter in response to one or more reference signals of the set of sidelink beam failure detection RSs having a received signal strength below a threshold. The first sidelink UE starts a beam failure detection timer in response to the reference signal(s) of the set of sidelink beam failure detection reference signals having the received signal strength below the threshold.

According to other aspects, a method by a sidelink UE may periodically transmit a set of sidelink beam failure detection reference signals (RSs) to another sidelink UE. The set of sidelink beam failure detection reference signals comprise one or more sidelink receive reference signals. The sidelink UE configures the other sidelink UE with the sidelink receive beam failure detection reference signal(s).

According to further aspects, a method of wireless communication by a base station comprises configuring a beam failure detection (BFD) timer expiration value for a sidelink user equipment (UE). The method also includes configuring the sidelink UE with a maximum BFD counter value and/or configuring the sidelink UE with a set of sidelink BFD reference signals.

In still other aspects, a method of wireless communication by a base station receives, from a first sidelink user equipment (UE), an indication of a sidelink beam failure. The method also reports the indication to a second sidelink UE.

According to aspects of the present disclosure, a sidelink UE for wireless communication includes means for periodically receiving a set of sidelink beam failure detection reference signals (RSs) from a second sidelink UE. The UE includes means for incrementing a beam failure detection (BFD) counter in response to one or more reference signals of the set of sidelink beam failure detection RSs having a received signal strength below a threshold. The sidelink UE includes means for starting a beam failure detection timer in response to the reference signal(s) of the set of sidelink beam failure detection reference signals having the received signal strength below the threshold.

According to other aspects, a sidelink UE includes means for periodically transmitting a set of sidelink beam failure detection reference signals (RSs) to another sidelink UE. The set of sidelink beam failure detection reference signals comprise one or more sidelink receive reference signals. The sidelink UE also includes means for configuring the other sidelink UE with the sidelink receive beam failure detection reference signal(s).

According to further aspects, a base station comprises means for configuring a beam failure detection (BFD) timer expiration value for a sidelink user equipment (UE). The base station also includes means for configuring the sidelink UE with a maximum BFD counter value and/or means for configuring the sidelink UE with a set of sidelink BFD reference signals.

In still other aspects, a base station includes means for receiving, from a first sidelink user equipment (UE), an indication of a sidelink beam failure. The base station also includes means for reporting the indication to a second sidelink UE.

According to aspects of the present disclosure, an apparatus for wireless communication, in a first sidelink UE, includes a processor, memory coupled with the processor, and instructions stored in the memory. The instructions are operable, when executed by the processor, to cause the apparatus to periodically receive a set of sidelink beam failure detection reference signals (RSs) from a second sidelink UE. The instructions are operable, when executed by the processor, to cause the apparatus to increment a beam failure detection (BFD) counter in response to one or more reference signals of the set of sidelink beam failure detection RSs having a received signal strength below a threshold. The instructions also cause the processor to start a beam failure detection timer in response to the reference signal(s) of the set of sidelink beam failure detection reference signals having the received signal strength below the threshold.

According to aspects of the present disclosure, an apparatus for wireless communication, in a first sidelink UE, includes a processor, memory coupled with the processor, and instructions stored in the memory. The instructions are operable, when executed by the processor, to cause the apparatus to periodically transmit a set of sidelink beam failure detection reference signals (RSs) to another sidelink UE. The set of sidelink beam failure detection reference signals comprise one or more sidelink receive reference signals. The instructions also cause the processor to configure the other sidelink UE with the sidelink receive beam failure detection reference signal(s).

According to aspects of the present disclosure, an apparatus for wireless communication, in a base station, includes a processor, memory coupled with the processor, and instructions stored in the memory. The instructions are operable, when executed by the processor, to cause the apparatus to configure a beam failure detection (BFD) timer expiration value for a sidelink user equipment (UE). The instructions also cause the base station to configure the sidelink UE with a maximum BFD counter value and/or configure the sidelink UE with a set of sidelink BFD reference signals.

In yet other aspects of the present disclosure, an apparatus for wireless communication, in a base station, includes a processor, memory coupled with the processor, and instructions stored in the memory. The instructions are operable, when executed by the processor, to cause the apparatus to receive, from a first sidelink user equipment (UE), an indication of a sidelink beam failure. The instructions also cause the base station to report the indication to a second sidelink UE.

According to an aspect of the present disclosure, a non-transitory computer-readable medium has program code recorded thereon. The program code is executed by a sidelink user equipment (UE) and comprising program code to periodically receive a set of sidelink beam failure detection reference signals (RSs) from a second sidelink UE. The program code also include instructions to increment a beam failure detection (BFD) counter in response to one or more reference signals of the set of sidelink beam failure detection RSs having a received signal strength below a threshold. The program code also includes instructions to start a beam failure detection timer in response to the reference signal(s) of the set of sidelink beam failure detection reference signals having the received signal strength below the threshold.

According to other aspect, a non-transitory computer-readable medium has program code recorded thereon. The program code is executed by a sidelink user equipment (UE) and comprises program code to periodically transmit a set of sidelink beam failure detection reference signals (RSs) to another sidelink UE. The set of sidelink beam failure detection reference signals comprise one or more sidelink receive reference signal. The program code also includes instructions to configure the other sidelink UE with the sidelink receive beam failure detection reference signal(s).

According to further aspects, a non-transitory computer-readable medium has program code recorded thereon. The program code is executed by a base station and comprises program code to configure a beam failure detection (BFD) timer expiration value for a sidelink user equipment (UE). The program code also includes instructions to configure the sidelink UE with a maximum BFD counter value and/or configure the sidelink UE with a set of sidelink BFD reference signals.

In yet other aspects, a non-transitory computer-readable medium has program code recorded thereon. The program code is executed by a base station and comprises program code to receive, from a first sidelink user equipment (UE), an indication of a sidelink beam failure. The program code also includes instructions to report the indication to a second sidelink UE.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

FIG. 7 is a block diagram showing a sidelink channel for a first user equipment (UE) and a second UE, in accordance with aspects of the present disclosure.

DETAILED DESCRIPTION

Figure 1:
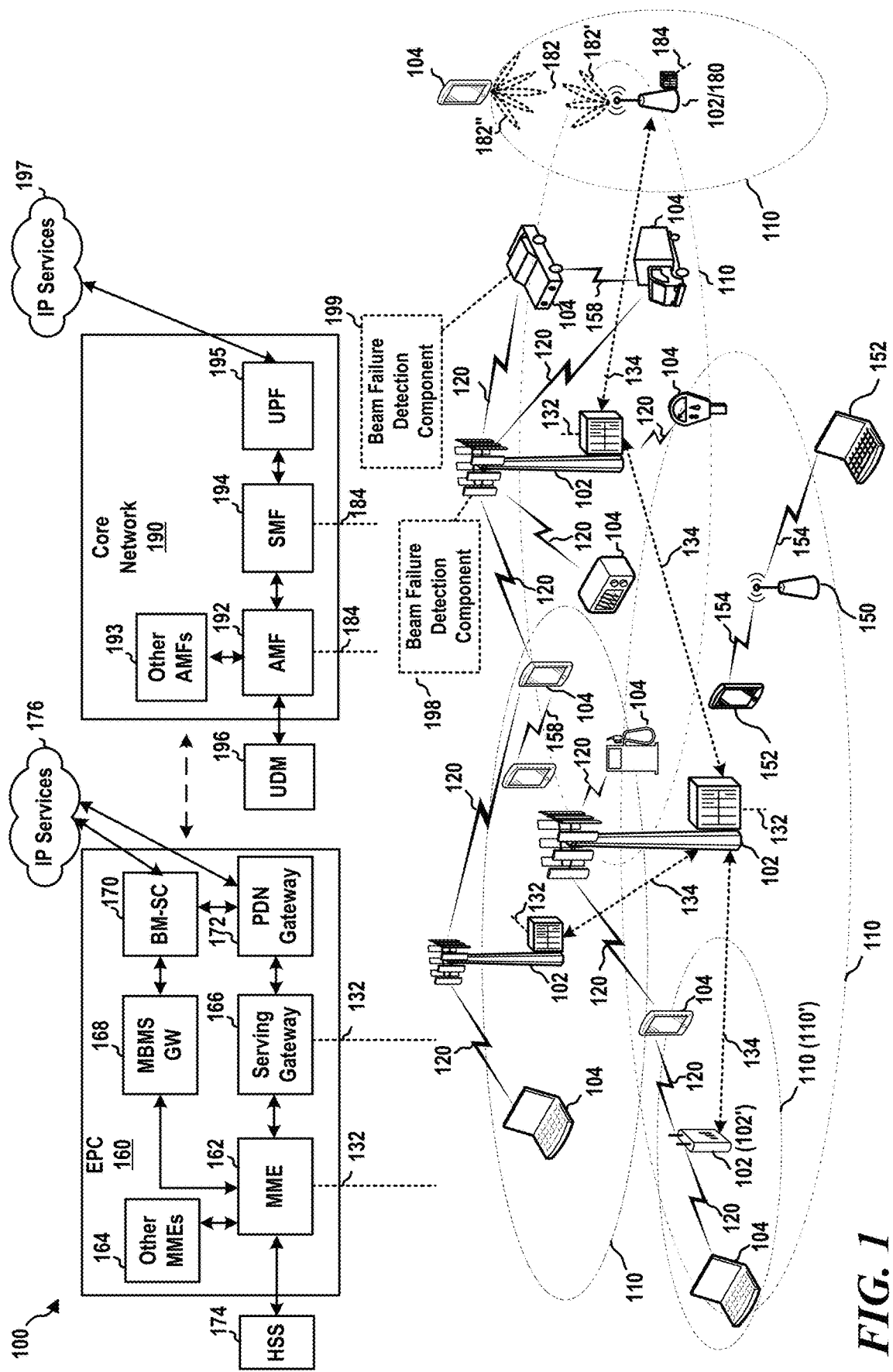
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In cellular communications networks, wireless devices may generally communicate with each other via one or more network entities such as a base station or scheduling entity. Some networks may support device-to-device (D2D) communications that enable discovery of, and communications with nearby devices using a direct link between devices (e.g., without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

D2D communications may be implemented using licensed or unlicensed bands. Additionally, D2D communications can avoid the overhead involving the routing to and from the base station. Therefore, D2D communications may improve throughput, reduce latency, and/or increase energy efficiency.

A type of D2D communications may include vehicle-to-everything (V2X) communications. V2X communications may assist autonomous vehicles in communicating with each other. For example, autonomous vehicles may include multiple sensors (e.g., light detection and ranging (LiDAR), radar, cameras, etc.). In most cases, the autonomous vehicle's sensors are line of sight sensors. In contrast, V2X communications may allow autonomous vehicles to communicate with each other for non-line of sight situations.

Sidelink (SL) communications refers to the communications among user equipment (UEs) without tunneling through a base station (BS) and/or a core network. Sidelink communications may be communicated over a physical sidelink control channel (PSCCH) and a physical sidelink shared channel (PSSCH). The PSCCH and PSSCH are similar to a physical downlink control channel (PDCCH) and a physical downlink shared channel (PDSCH) in downlink (DL) communications between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communications may include, among others, vehicle-to-everything (V2X), industrial Internet of things (IIoT), and/or NR-lite.

Sidelink communications may occur in millimeter wave (mmWave) frequencies. Accordingly, beamforming is employed. With beamforming, a transmitting UE beam and a receiving UE beam should be aligned to create a sidelink channel for communications. When beams between sidelink UEs communicating with one another become misaligned, a signal-to-noise ratio (SNR) drops, adversely impacting communications between the UEs. The beams may become misaligned due to movement of a UE or other changes in the environment, such as when a bus moves between two communicating UEs. It is desirable for a UE to be able to detect the misalignment so the UEs may start a beam failure recovery process.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mmWave/near mmWave radio frequency band (e.g., 3 GHz-300 GHz) has extremely high path loss and a short range. The mmWave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMES 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting evolved MBMS (eMBMS) related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a sidelink UE, such as the UE 104, may detect sidelink beam failure. The UE 104 may include a beam failure detection component 199 configured to track strengths of beam failure detection reference signals and initiate beam failure recovery procedures based on the signal strengths. A base station, such as the base station 102, may operate with sidelink beam failure features. The base station 102 may include a beam failure detection component 198 configured to communicate with a sidelink UE 104 for beam failure functions.

Although the following description may be focused on 5G NR, it may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT)

spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology ~=5 has a subcarrier spacing of 480 kHz. The symbol length/duration is inversely related to the subcarrier spacing. FIGS. 2A-2D provide an example of slot configuration 0 with 14 symbols per slot and numerology ~=0 with 1 slot per subframe. The subcarrier spacing is 15 kHz and symbol duration is approximately 66.7 µs.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment/negative acknowledgment (ACK/NACK) feedback. The PUSCH carries data, and may additionally be used to carry a buffer status report (BSR), a power headroom report (PHR), and/or UCI.

Figure 3:
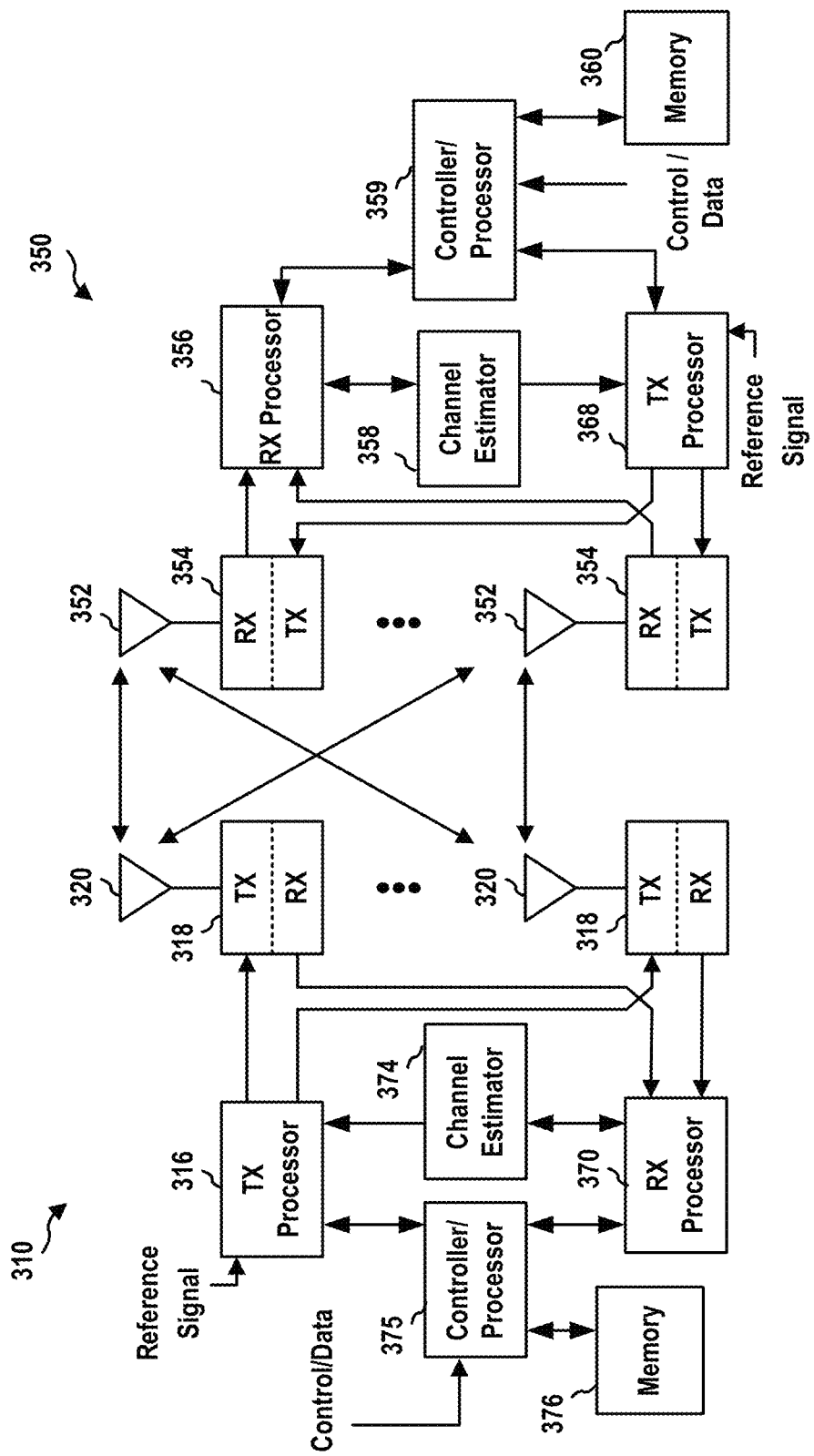
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the beam failure detection component 199 of FIG. 1. Additionally, at least one of the TX processor 316, the RX processor 370, and the controller/processor 375 may be configured to perform aspects in connection with the beam failure detection component 198 of FIG. 1.

In some aspects, the UE 104, 350 and/or base station 102, 310 may include means for receiving, means for incrementing, means for starting, means for resetting, means for declaring, means for adjusting, means for indicating, means for switching, means for configuring, means for informing, means for transmitting, and/or means for reporting. Such means may include one or more components of the UE 104, 350 and/or base station 102, 310 described in connection with FIGS. 1 and 3.

Figure 4:
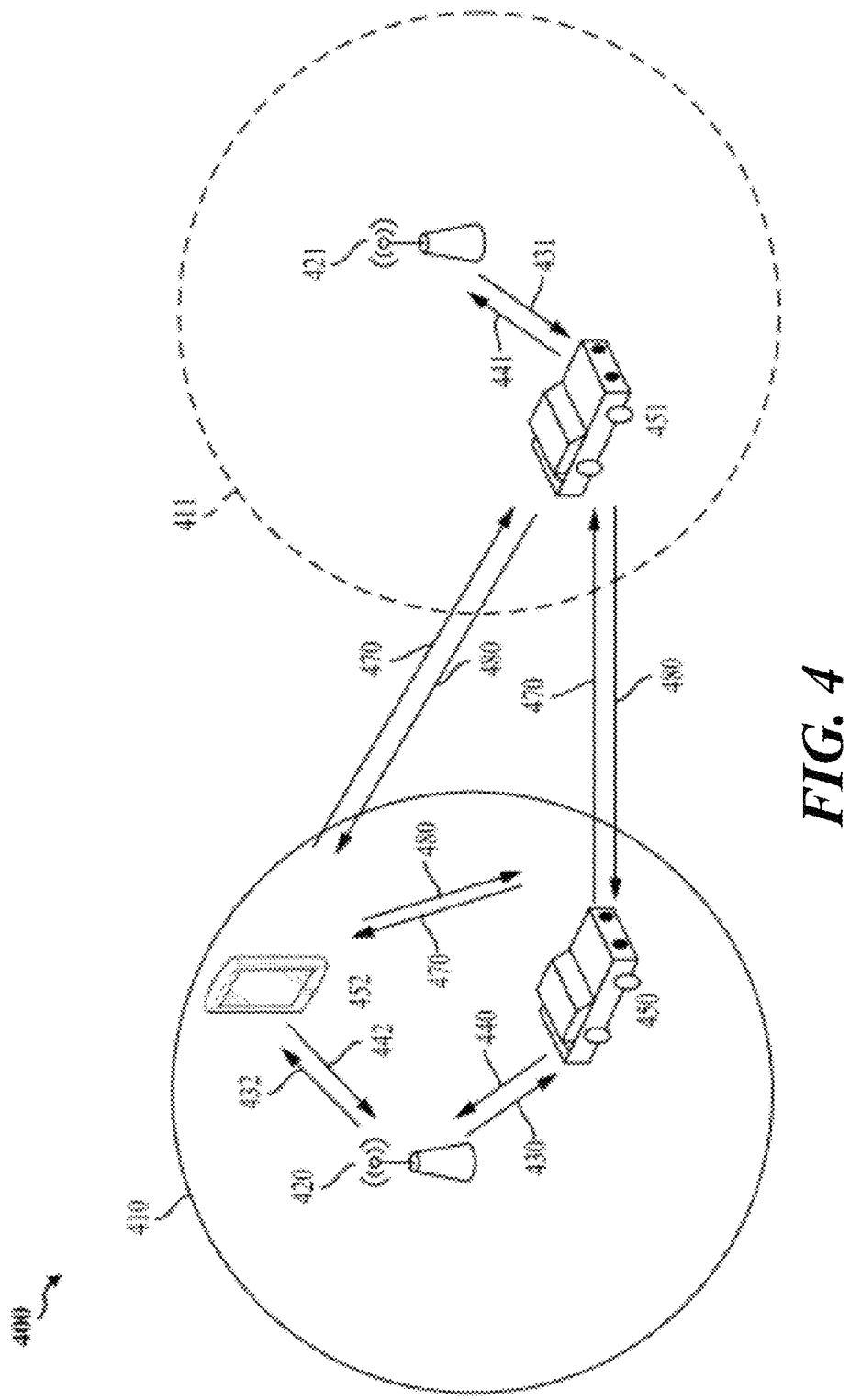
FIG. 4 is a diagram illustrating an example of a vehicle-to-everything (V2X) system, in accordance with various aspects of the present disclosure.

FIG. 4 is a diagram of a device-to-device (D2D) communications system 400, including V2X communications, in accordance with various aspects of the present disclosure. For example, the D2D communications system 400 may include V2X communications, (e.g., a first UE 450 communicating with a second UE 451). In some aspects, the first UE 450 and/or the second UE 451 may be configured to communicate in a licensed radio frequency spectrum and/or a shared radio frequency spectrum. The shared radio frequency spectrum may be unlicensed, and therefore multiple different technologies may use the shared radio frequency spectrum for communications, including new radio (NR), LTE, LTE-Advanced, licensed assisted access (LAA), dedicated short range communications (DSRC), MuLTEFire, 4G, and the like. The foregoing list of technologies is to be regarded as illustrative, and is not meant to be exhaustive.

The D2D communications system 400 may use NR radio access technology. Of course, other radio access technologies, such as LTE radio access technology, may be used. In D2D communications (e.g., V2X communications or vehicle-to-vehicle (V2V) communications), the UEs 450, 451 may be on networks of different mobile network operators (MNOs). Each of the networks may operate in its own radio frequency spectrum. For example, the air interface to a first UE 450 (e.g., Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communications between or among the UEs 450, 451 in licensed radio frequency spectrum and/or a shared radio frequency spectrum (e.g., 5 GHz radio spectrum bands).

The shared radio frequency spectrum may be unlicensed, and therefore different technologies may use the shared radio frequency spectrum for communications. In some aspects, a D2D communications (e.g., sidelink communications) between or among UEs 450, 451 is not scheduled by MNOs. The D2D communications system 400 may further include a third UE 452.

The third UE 452 may operate on the first network 410 (e.g., of the first MNO) or another network, for example. The third UE 452 may be in D2D communications with the first UE 450 and/or second UE 451. The first base station 420 (e.g., gNB) may communicate with the third UE 452 via a downlink (DL) carrier 432 and/or an uplink (UL) carrier 442. The DL communications may be use various DL resources (e.g., the DL subframes (FIG. 2A) and/or the DL channels (FIG. 2B)). The UL communications may be performed via the UL carrier 442 using various UL resources (e.g., the UL subframes (FIG. 2C) and the UL channels (FIG. 2D)).

The first network 410 operates in a first frequency spectrum and includes the first base station 420 (e.g., gNB) communicating at least with the first UE 450, for example, as described in FIGS. 1-3. The first base station 420 (e.g., gNB) may communicate with the first UE 450 via a DL carrier 430 and/or an UL carrier 440. The DL communications may be use various DL resources (e.g., the DL subframes (FIG. 2A) and/or the DL channels (FIG. 2B)). The UL communications may be performed via the UL carrier 440 using various UL resources (e.g., the UL subframes (FIG. 2C) and the UL channels (FIG. 2D)).

In some aspects, the second UE 451 may be on a different network from the first UE 450. In some aspects, the second UE 451 may be on a second network 411 (e.g., of the second MNO). The second network 411 may operate in a second frequency spectrum (e.g., a second frequency spectrum different from the first frequency spectrum) and may include the second base station 421 (e.g., gNB) communicating with the second UE 451, for example, as described in FIGS. 1-3.

The second base station 421 may communicate with the second UE 451 via a DL carrier 431 and an UL carrier 441. The DL communications are performed via the DL carrier 431 using various DL resources (e.g., the DL subframes (FIG. 2A) and/or the DL channels (FIG. 2B)). The UL communications are performed via the UL carrier 441 using various UL resources (e.g., the UL subframes (FIG. 2C) and/or the UL channels (FIG. 2D)).

In conventional systems, the first base station 420 and/or the second base station 421 assign resources to the UEs for device-to-device (D2D) communications (e.g., V2X communications and/or V2V communications). For example, the resources may be a pool of UL resources, both orthogonal (e.g., one or more frequency division multiplexing (FDM) channels) and non-orthogonal (e.g., code division multiplexing (CDM)/resource spread multiple access (RSMA) in each channel). The first base station 420 and/or the second base station 421 may configure the resources via the PDCCH (e.g., faster approach) or RRC (e.g., slower approach).

In some systems, each UE 450, 451 autonomously selects resources for D2D communications. For example, each UE 450, 451 may sense and analyze channel occupation during the sensing window. The UEs 450, 451 may use the sensing information to select resources from the sensing window. As discussed, one UE 451 may assist another UE 450 in performing resource selection. The UE 451 providing assistance may be referred to as the receiver UE or partner UE, which may potentially notify the transmitter UE 450. The transmitter UE 450 may transmit information to the receiving UE 451 via sidelink communications.

The D2D communications (e.g., V2X communications and/or V2V communications) may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (e.g., multiple) devices, including to the second UE 451 via the first sidelink carrier 470. The second UE 451 may transmit to one or more (e.g., multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communications on a sidelink carrier may occur between the first UE 450 and the second UE 451. In an aspect, the first UE 450 may perform sidelink communications with one or more (e.g., multiple) devices, including the second UE 451 via the first sidelink carrier 470. For example, the first UE 450 may transmit a broadcast transmission via the first sidelink carrier 470 to the multiple devices (e.g., the second and third UEs 451, 452). The second UE 451 (e.g., among other UEs) may receive such broadcast transmission. Additionally or alternatively, the first UE 450 may transmit a multicast transmission via the first sidelink carrier 470 to the multiple devices (e.g., the second and third UEs 451, 452). The second UE 451 and/or the third UE 452 (e.g., among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (e.g., among other UEs) may receive such unicast transmission. Additionally or alternatively, the second UE 451 may perform sidelink communications with one or more (e.g., multiple) devices, including the first UE 450 via the second sidelink carrier 480. For example, the second UE 451 may transmit a broadcast transmission via the second sidelink carrier 480 to the multiple devices. The first UE 450 (e.g., among other UEs) may receive such broadcast transmission.

In another example, the second UE 451 may transmit a multicast transmission via the second sidelink carrier 480 to the multiple devices (e.g., the first and third UEs 450, 452). The first UE 450 and/or the third UE 452 (e.g., among other UEs) may receive such multicast transmission. Further, the second UE 451 may transmit a unicast transmission via the second sidelink carrier 480 to a device, such as the first UE 450. The first UE 450 (e.g., among other UEs) may receive such unicast transmission. The third UE 452 may communicate in a similar manner.

In some aspects, for example, such sidelink communications on a sidelink carrier between the first UE 450 and the second UE 451 may occur without having MNOs allocating resources (e.g., one or more portions of a resource block (RB), slot, frequency band, and/or channel associated with a sidelink carrier 470, 480) for such communications and/or without scheduling such communications. Sidelink communications may include traffic communications (e.g., data communications, control communications, paging communications and/or system information communications). Further, sidelink communications may include sidelink feedback communications associated with traffic communications (e.g., a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 400 between devices (e.g., a first UE 450, a second UE 451, and/or a third UE 452). As discussed, a UE may be a vehicle (e.g., UE 450, 451), a mobile device (e.g., 452), or another type of device. In some cases, a UE may be a special UE, such as a road side unit (RSU).

Figure 5:
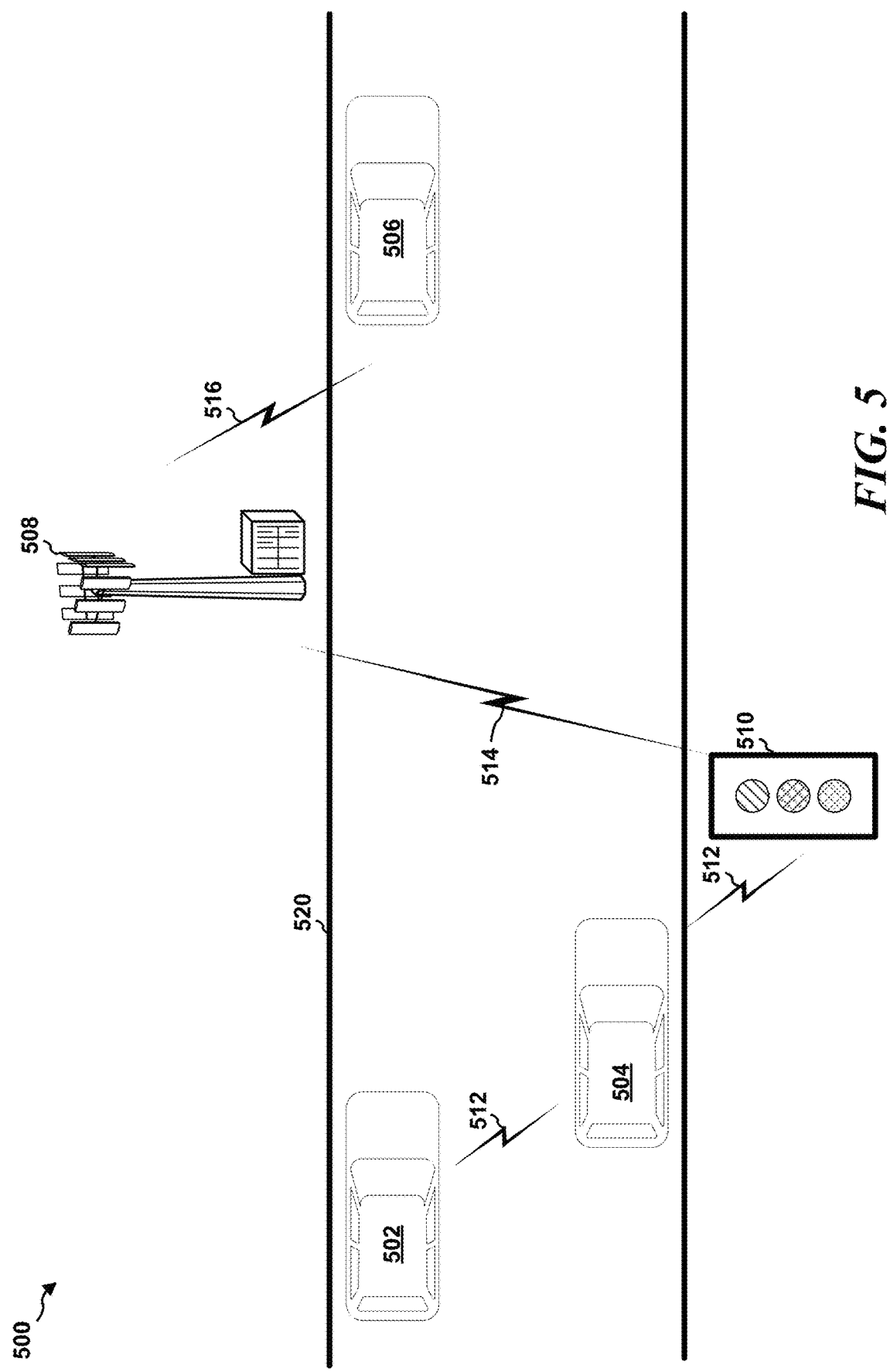
FIG. 5 is a block diagram illustrating an example of a vehicle-to-everything (V2X) system with a road side unit (RSU), according to aspects of the present disclosure.

FIG. 5 illustrates an example of a V2X system 500 with an RSU 510 according to aspects of the present disclosure. As shown in FIG. 5, a transmitter UE 504 transmits data to an RSU 510 and a receiving UE 502 via sidelink transmissions 512. Additionally, or alternatively, the RSU 510 may transmit data to the transmitter UE 504 via a sidelink transmission 512. The RSU 510 may forward data received from the transmitter UE 504 to a cellular network (e.g., gNB) 508 via an UL transmission 514. The gNB 508 may transmit the data received from the RSU 510 to other UEs 506 via a DL transmission 516. The RSU 510 may be incorporated with traffic infrastructure (e.g., traffic light, light pole, etc.) For example, as shown in FIG. 5, the RSU 510 is a traffic signal positioned at a side of a road 520. Additionally or alternatively, RSUs 510 may be stand-alone units.

Figure 6:
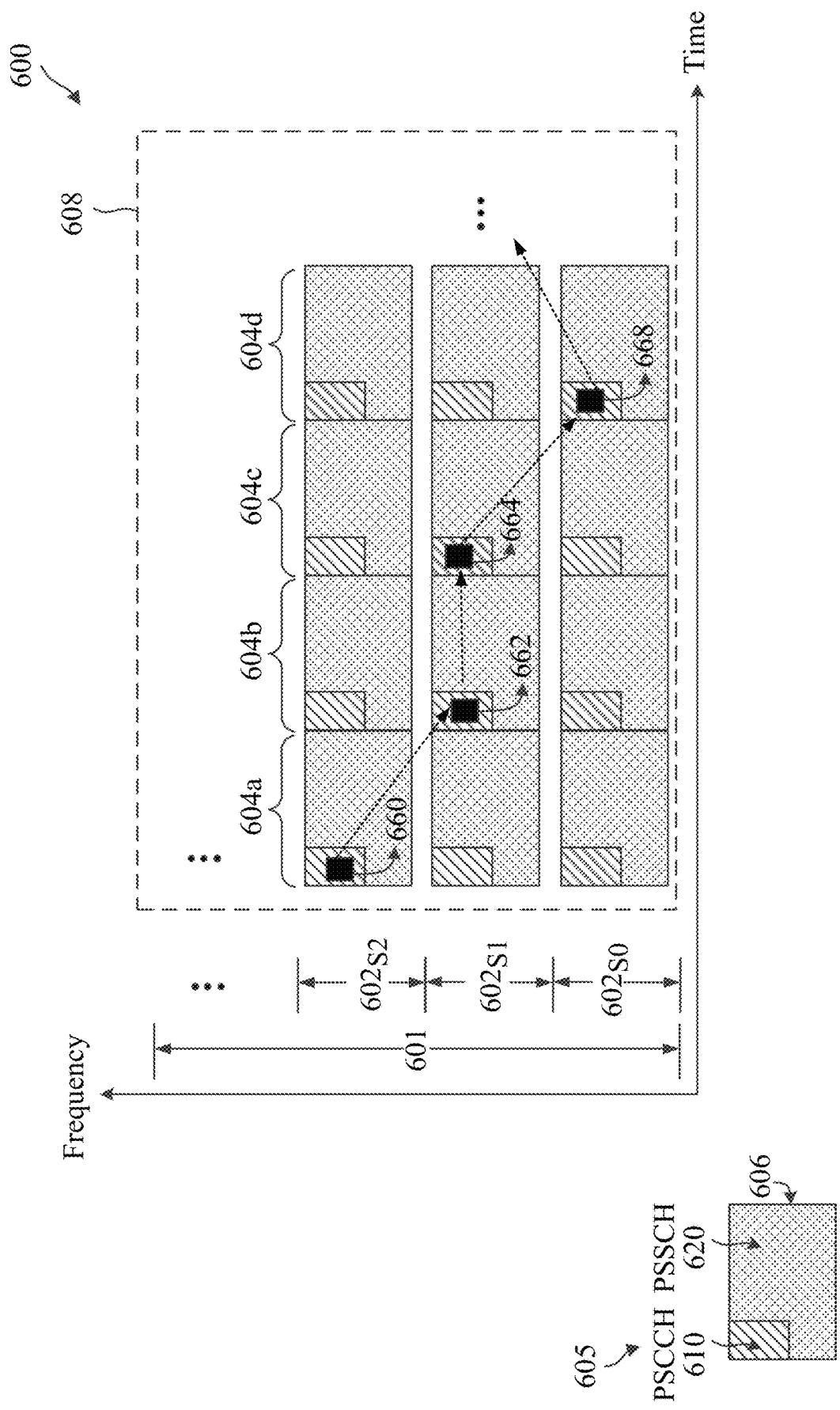
FIG. 6 illustrates a sidelink (SL) communications scheme, in accordance with various aspects of the present disclosure.

FIG. 6 illustrates a sidelink communications scheme 600 according to some aspects of the present disclosure. The scheme 600 may be employed by UEs such as the UEs 104 in a network such as the network 100. In FIG. 6, the x-axis represents time and the y-axis represents frequency.

In the scheme 600, a shared radio frequency band 601 is partitioned into multiple subchannels or frequency subbands 602 (shown as 602S0, 602S1, 602S2) in frequency and multiple sidelink frames 604 (shown as 604a, 604b, 604c, 604d) in time for sidelink communications. The frequency band 601 may be at any suitable frequencies. The frequency band 601 may have any suitable bandwidth (BW) and may be partitioned into any suitable number of frequency subbands 602. The number of frequency subbands 602 can be dependent on the sidelink communications BW requirement.

Each sidelink frame 604 includes a sidelink resource 606 in each frequency subband 602. A legend 605 indicates the types of sidelink channels within a sidelink resource 606. In some instances, a frequency gap or guard band may be specified between adjacent frequency subbands 602, for example, to mitigate adjacent band interference. The sidelink resource 606 may have a substantially similar structure as an NR sidelink resource. For instance, the sidelink resource 606 may include a number of subcarriers or RBs in frequency and a number of symbols in time. In some instances, the sidelink resource 606 may have a duration between about one millisecond (ms) to about 20 ms. Each sidelink resource 606 may include a PSCCH 610 and a PSSCH 620. The PSCCH 610 and the PSSCH 620 can be multiplexed in time and/or frequency. In the example of FIG. 6, for each sidelink resource 606, the PSCCH 610 is located during the beginning symbol(s) of the sidelink resource 606 and occupies a portion of a corresponding frequency subband 602, and the PSSCH 620 occupies the remaining time-frequency resources in the sidelink resource 606. In some instances, a sidelink resource 606 may also include a physical sidelink feedback channel (PSFCH), for example, located during the ending symbol(s) of the sidelink resource 606. In general, a PSCCH 610, a PSSCH 620, and/or a PSFCH may be multiplexed within a sidelink resource 606.

The PSCCH 610 may carry SCI 660 and/or sidelink data. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IIoT application, the sidelink data may carry IIoT data (e.g., sensor measurements, device measurements, temperature readings, etc.). The PSFCH can be used for carrying feedback information, for example, HARQ ACK/NACK for sidelink data received in an earlier sidelink resource 606.

In an NR sidelink frame structure, the sidelink frames 604 in a resource pool 608 may be contiguous in time. A sidelink UE (e.g., the UEs 104) may include, in SCI 660, a reservation for a sidelink resource 606 in a later sidelink frame 604. Thus, another sidelink UE (e.g., a UE in the same NR-U sidelink system) may perform SCI sensing in the resource pool 608 to determine whether a sidelink resource 606 is available or occupied. For instance, if the sidelink UE detected SCI indicating a reservation for a sidelink resource 606, the sidelink UE may refrain from transmitting in the reserved sidelink resource 606. If the sidelink UE determines that there is no reservation detected for a sidelink resource 606, the sidelink UE may transmit in the sidelink resource 606. As such, SCI sensing can assist a UE in identifying a target frequency subband 602 to reserve for sidelink communications and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 602 in one sidelink frame 604 to another frequency subband 602 in another sidelink frame 604. In the illustrated example of FIG. 6, during the sidelink frame 604a, the sidelink UE transmits SCI 660 in the sidelink resource 606 located in the frequency subband $602_{S2}$ to reserve a sidelink resource 606 in a next sidelink frame 604b located at the frequency subband $602_{S1}$. Similarly, during the sidelink frame 604b, the sidelink UE transmits SCI 662 in the sidelink resource 606 located in the frequency subband $602_{S1}$ to reserve a sidelink resource 606 in a next sidelink frame 604c located at the frequency subband 602S1. During the sidelink frame 604c, the sidelink UE transmits SCI 664 in the sidelink resource 606 located in the frequency subband $602_{S1}$ to reserve a sidelink resource 606 in a next sidelink frame 604d located at the frequency subband $602_{S0}$. During the sidelink frame 604d, the sidelink UE transmits SCI 668 in the sidelink resource 606 located in the frequency subband $602_{S0}$. The SCI 668 may reserve a sidelink resource 606 in a later sidelink frame 604.

The SCI can also indicate scheduling information and/or a destination identifier (ID) identifying a target receiving sidelink UE for the next sidelink resource 606. Thus, a sidelink UE may monitor SCI transmitted by other sidelink UEs. Upon detecting SCI in a sidelink resource 606, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 604 in different frequency subband (e.g., via frequency division multiplexing (FDM)). For instance, in the sidelink frame 604b, one pair of sidelink UEs may communicate sidelink data using a sidelink resource 606 in the frequency subband 602S2 while another pair of sidelink UEs may communicate sidelink data using a sidelink resource 606 in the frequency subband 602S1.

In some aspects, the scheme 600 is used for synchronous sidelink communications. That is, the sidelink UEs may be synchronized in time and are aligned in terms of symbol boundary, sidelink resource boundary (e.g., the starting time of sidelink frames 604). The sidelink UEs may perform synchronization in a variety of forms, for example, based on sidelink synchronization signal blocks (SSBs) received from a sidelink UE and/or NR-U SSBs received from a BS (e.g., the BSs 105 and/or 205) while in-coverage of the BS. In some aspects, the sidelink UE may be preconfigured with the resource pool 608 in the frequency band 601, for example, while in coverage of a serving BS. The resource pool 608 may include a plurality of sidelink resources 606. The BS can configure the sidelink UE with a resource pool configuration indicating resources in the frequency band 601 and/or the subbands 602 and/or timing information associated with the sidelink frames 604. In some aspects, the scheme 600 includes mode-2 radio resource allocation (RRA) (e.g., supporting autonomous RRA that can be used for out-of-coverage sidelink UEs or partial-coverage sidelink UEs).

Sidelink communications may occur in millimeter wave (mmWave) frequencies. Accordingly, beamforming is employed. With beamforming, a transmitting UE beam and a receiving UE beam should be aligned to create a sidelink channel for communications. When beams between sidelink UEs communicating with one another become misaligned, a signal-to-noise ratio (SNR) drops, adversely impacting communications between the UEs. The beams may become misaligned due to movement of a UE or other changes in the environment, such as when a bus moves between two communicating UEs. It is desirable for a UE to be able to detect the misalignment so the UEs may start a beam failure recovery process. The detection of the misalignment is referred to as beam failure detection (BFD).

FIG. 7 is a block diagram showing a sidelink (SL) channel for a first UE (UE1) and a second UE (UE2), in accordance with aspects of the present disclosure. The sidelink channel includes a beam 710 for UE1 to communicate with UE2. The channel also includes a beam 720 for UE2 to communicate with UE1. In many situations, the transmit (Tx) beam that UE2 uses to transmit to UE1 is the same as the receive (Rx) beam that UE2 uses to receive from UE1. FIG. 7 shows such a case. However, there are some exceptions (e.g., due to maximum permissible exposure (MPE) limits) when separate and distinct beams are employed for transmitting and receiving.

When a sidelink channel between UE1 and UE2 changes or if one or both of UE1 and UE2 move, the sidelink beams 710, 720 will not be aligned, resulting in the UEs not being able to communicate. Aspects of the present disclosure include techniques to detect when sidelink beams are not aligned (e.g., beam failure detection (BFD)), so that the UE(s) may begin the process of discovering another set of beams to reestablish their connection. This process is referred to as beam failure recovery (BFR).

Figure 8:
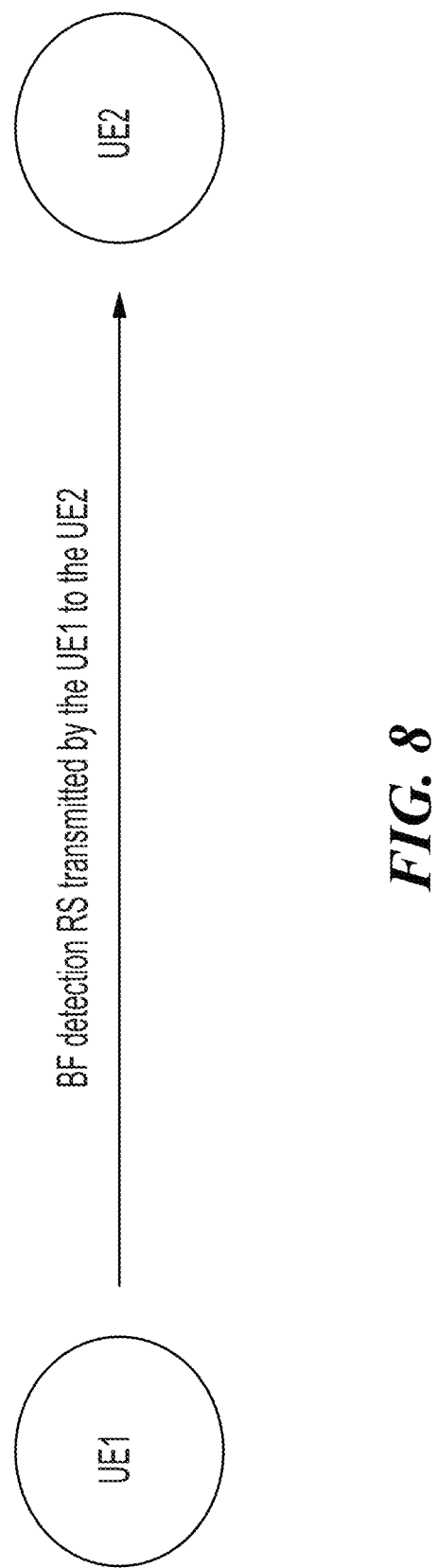
FIG. 8 is a block diagram showing a beam failure detection (BFD) reference signal transmitted by a first user equipment (UE) to a second UE, in accordance with aspects of the present disclosure.

FIG. 8 is a block diagram showing a beam failure detection (BFD) reference signal (or pilot) transmitted by a first UE (UE1) to a second UE (UE2). According to aspects of the present disclosure, the second UE (UE2) has a beam failure detection (BFD) counter configured to count a number of times BFD reference signals from UE1 are received below a threshold level before a BFD timer expires. The threshold level may be a layer one-reference signal received power (L1-RSRP) threshold in one example. If the BFD counter equals a BFD maximum counter value before the BFD timer expires, the UE declares beam failure (BF) and triggers beam failure recovery. The UE declares beam failure by sending a message indicating the failure.

According to aspects of the present disclosure, UE1 has a set of BFD transmit reference signals (e.g., slTxRadioLinkMonitoringRS) and UE2 has a set of BFD receive reference signals (e.g., slRxRadioLinkMonitoringRS) for beam failure detection. The BFD transmit and receive reference signals may be a sidelink synchronization signal block (SL SSB) reference signal and a SL channel state information reference signal (SL CSI-RS), in some examples.

The set of BFD transmit reference signals (e.g., slTxRadioLinkMonitoringRS) may include a list of beam failure detection (BFD) reference signals to transmit. The set of BFD receive reference signals (e.g., slRxRadioLinkMonitoringRS) may include a list of beam failure detection (BFD) reference signals to receive.

A BFD maximum counter value, a BFD timer expiration time, the BFD transmit reference signals (e.g., slTxRadioLinkMonitoringRs), and the BFD receive reference signals (e.g., slRxRadioLinkMonitoringRs) may be configured in accordance with different options. In a first option, for UE1, the transmitter of the BFD reference signal, may configure UE2's BFD receive reference signals (e.g., slRxRadioLinkMonitoringRs), BFD maximum counter value, and BFD timer expiration time. In this option, UE1 configures its own BFD transmit reference signals (e.g., slTxRadioLinkMonitoringRs). In a second option, for UE2, the receiver of the BFD reference signal, may configure UE1's BFD transmit reference signals (e.g., slTxRadioLinkMonitoringRs), while UE2 configures its own BFD receive reference signals (e.g., slRxRadioLinkMonitoringRs), BFD maximum counter value, and BFD timer expiration time. In a third option, a base station (e.g., gNB) configures all four of the BFD maximum counter value, BFD timer expiration time, BFD transmit reference signals, and BFD receive reference signals. Additionally, for the first and second options, the configurations may be relayed by a base station to the other UE.

According to aspects of the present disclosure, if there is a beam failure indication (BFI), certain steps are taken. First, if the BFD timer is not running, the BFD timer is started or restarted. Second, the BFD counter is incremented when the received signal strength (e.g., L1-RSRP) of all receive reference signals is less than a threshold value (e.g., Qout). In another option, the received signal strength of some of the received reference signals is less than a threshold value. When the signal strengths are all less (or some less) than the threshold value, a beam failure indication occurs. If the BFD counter is greater than or equal to the BFD maximum counter value before the BFD timer expires, beam failure recovery (BFR) is triggered and a BFR timer starts. If the BFD timer expires, the BFD counter is reset to 0. In other words, no more beam failure indications occurred before the BFD timer expired, signifying the current beams are still aligned.

Figure 9:
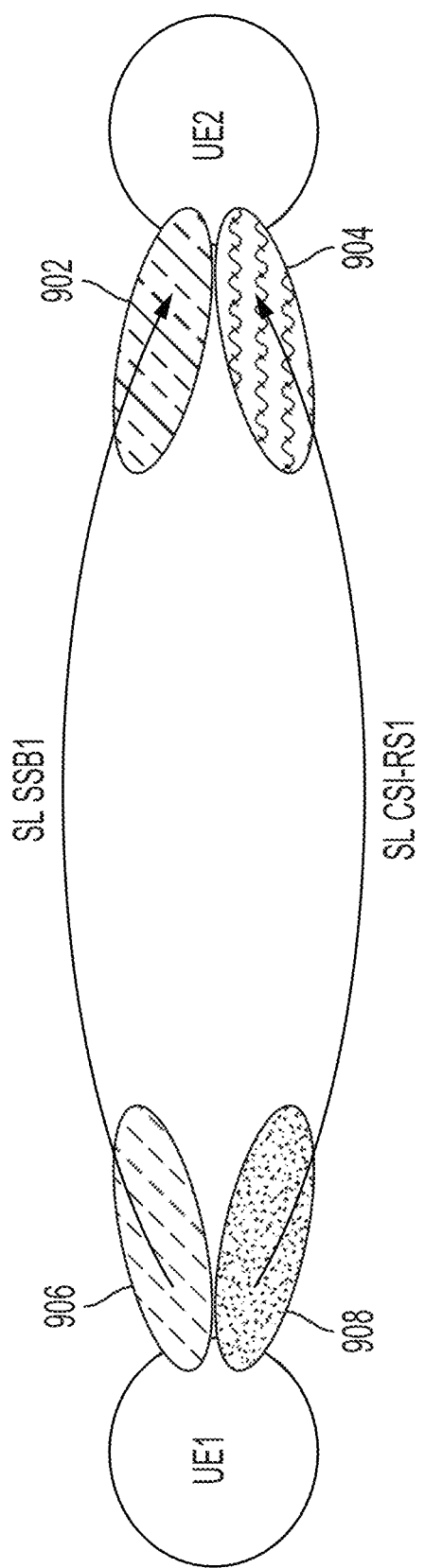
FIG. 9 is a block diagram illustrating beam failure detection (BFD), in accordance with aspects of the present disclosure.

FIG. 9 is a block diagram illustrating beam failure detection, in accordance with aspects of the present disclosure. As shown in FIG. 9, a second UE (UE2) is configured to monitor a first sidelink (SL) synchronization signal block reference signal (SLS SB1) and a first SL channel state information reference signal (SL CSI-RS1) transmitted by a first UE (UE1) for beam failure detection (BFD) between UE1 and UE2. The UE2 set of BFD receive reference signals (e.g., slRxRadioLinkMonitoringRS) includes the first SL SSB (SL SSB1) and the first SL CSI-RS (SL-CSI-RS1). Based on locally stored information, UE2 is aware of which receive beams 902, 904 to use to receive the set of BFD receive reference signals (e.g., slRxRadioLinkMonitoringRS). UE1 is configured to transmit the SL SSB1 and SL CSI-RS1 for UE2 to receive and to monitor for beam failure detection. The UE1 set of BFD transmit reference signals (e.g., slTxRadioLinkMonitoringRS) includes the first SL SSB (SL SSB1) and the first SL CSI-RS (SL CSI-RS1). UE1 is aware of which transmit beams 906, 908 to use to transmit the set of BFD transmit reference signals (e.g., slTxRadioLinkMonitoringRS) based on locally stored information.

Figure 10:
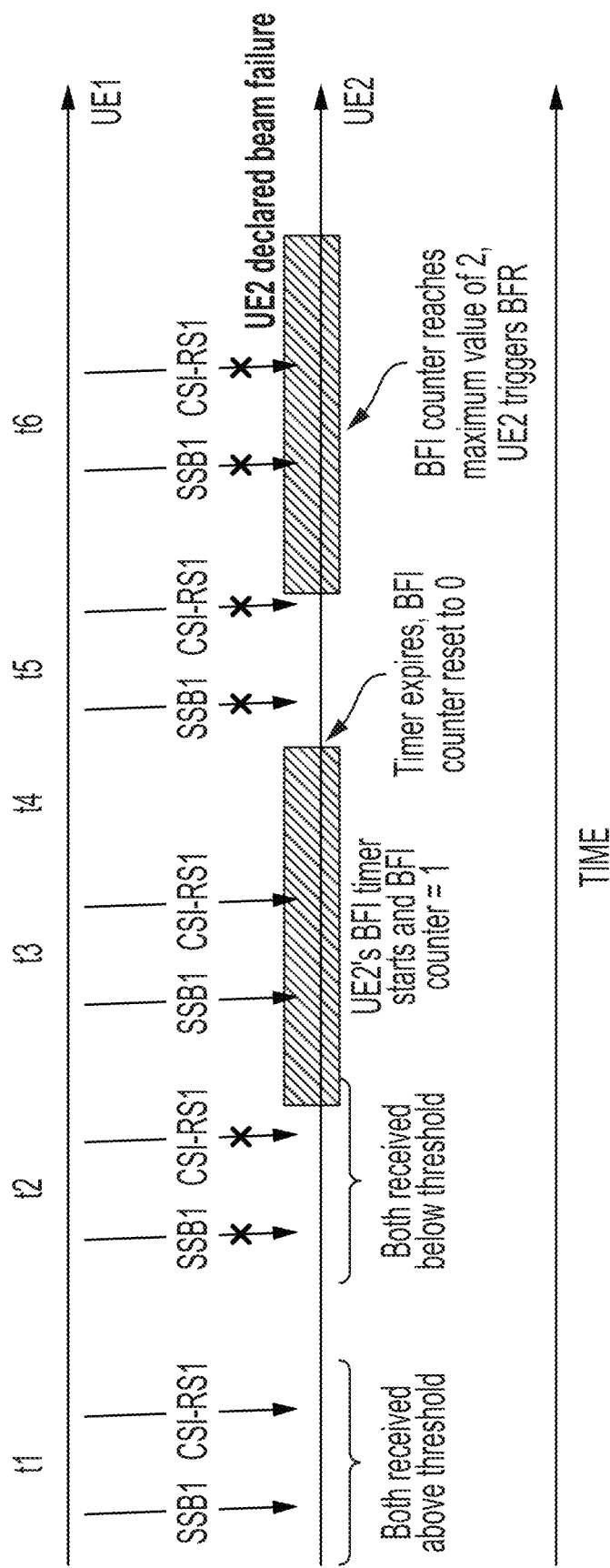
FIG. 10 is a diagram illustrating an exemplary timeline for monitoring periodically transmitted beam failure detection (BFD) reference signals (RSs), in accordance with aspects of the present disclosure.

FIG. 10 is a diagram illustrating an exemplary timeline for monitoring periodically transmitted beam failure detection reference signals, in accordance with aspects of the present disclosure. At time t1, UE1 transmits BFD reference signals, in this case SSB1 and CSI-RS1, to UE2. Both received signals are stronger than the threshold. At time t2, UE1 again transmits BFD reference signals (SSB1 and CSI-RS1) to UE2. Both received signals are weaker than the threshold. Thus, UE2 starts the BFD timer and increases the BFD counter to one. At time t3, UE1 transmits BFD reference signals (SSB1 and CSI-RS1) to UE2. Both signals are stronger than the threshold. Thus, the BFD counter remains the same. At time t4, the BFD timer expires. Because the maximum BFD counter value (e.g., two in this example) has not been reached before the BFD timer expires, the BFD counter resets.

At time t5, UE1 transmits BFD reference signals (SSB1 and CSI-RS1) to UE2. Both received signals are weaker than the threshold. Thus, UE2 starts the BFD timer and increases the BFD counter to one. At time t6, UE1 transmits BFD reference signals (SSB1 and CSI-RS1) to UE2. Both signals are weaker than the threshold. Thus, UE2 increases the BFD counter to two, which is the maximum in this example. Because the maximum is reached prior to the BFD timer expiring, UE2 declares a beam failure.

Although FIG. 10 shows sequential events triggering the beam failure, the present disclosure is not so limited. For example, a set of strong BFD reference signals may be received between times t5 and t6. The counter would not reset in response to the strong reference signals at this time. Thus, the weak BFD reference signals at time t6 would still trigger a declaration of beam failure.

According to further aspects of the present disclosure, when UE2 is receiving BFD reference signals (e.g., slRxRadioLinkMonitoringRS) from UE1, UE2 may change and/or adjust the receive beams. For example, instead of receiving SL-SSB1 with receive beam 1, UE2 may use a neighboring beam (e.g., receive beam 2) to receive SL-SSB1. This change may occur because UE2 has rotated slightly, and the adjusted beam compensates for the slight rotation. Based on the changes in the receive beams used to receive the BFD reference signals (e.g., slRxRadioLinkMonitoringRS), UE2 may send a message to UE1 indicating the changes in UE2's receive beams for receiving the BFD reference signals (e.g., slRxRadioLinkMonitoringRS). UE1 may change and/or refine its transmit beams for its BFD reference signals (e.g., slTxRadioLinkMonitoringRS) in response to receiving the message.

Three options are described for determining which UE transmits the beam failure detection (BFD) reference signal and which UE receives the reference signal. In a first option, one UE is randomly chosen to be the transmitter. In the first option, the transmitter and receiver roles may or may not change. If the roles change, the role switch may occur periodically or based on a condition, such as a number of sidelink connections for a UE. When the transmitter and receiver roles change, the receiving UE (before the switch) may trigger beam failure recovery if the BFD counter is not zero or is above a certain threshold (but not at the maximum counter value).

Figure 11:
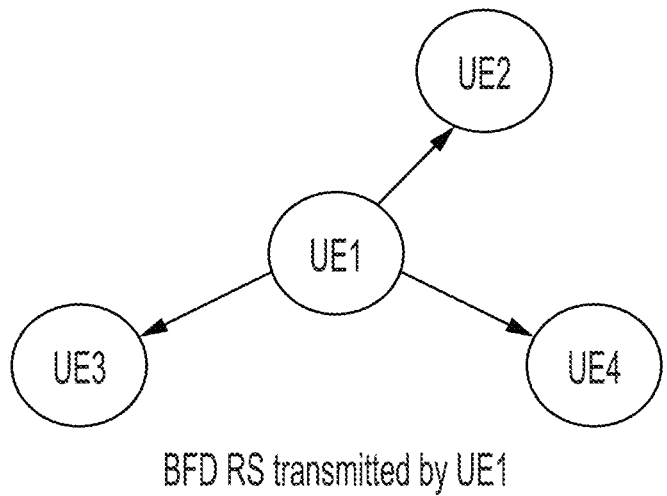
FIG. 11 is a block diagram illustrating a configuration for user equipments (UEs) transmitting and receiving beam failure detection (BFD) reference signals (RSs), in accordance with aspects of the present disclosure.

In a second option, if a first UE has many sidelink connections to a number of other sidelink UEs, then the first UE may be the transmitter and the other UEs may be the receivers. FIG. 11 shows an example of the second option. FIG. 11 is a block diagram illustrating a configuration for user equipments (UEs) transmitting and receiving beam failure detection (BFD) reference signals (RSs), in accordance with aspects of the present disclosure. In FIG. 11, UE1 has three sidelink connections: to UE2, UE3, and UE4. Each of the other UEs only has a single sidelink connection. Thus, UE1 is designated as the transmitter because UE1 has more sidelink connections than the other UEs. If UE1 was a receiver, UE1 would receive the BFD reference signals from all of the other UEs. In that case, UE1 tracks multiple sidelinks (e.g., as opposed to UE2 keeping track of the UE1-UE2 sidelink, UE3 keeping track of the UE1-UE3 sidelink, and UE4 keeping track of the UE1-UE4 sidelink.) Moreover, UE1 may have to send and receive control signals to the other UEs to ensure the BFD reference signal resources do not conflict. If UE1 is the transmitter, UE1 would be able to prevent the conflicts on its own.

Figure 12:
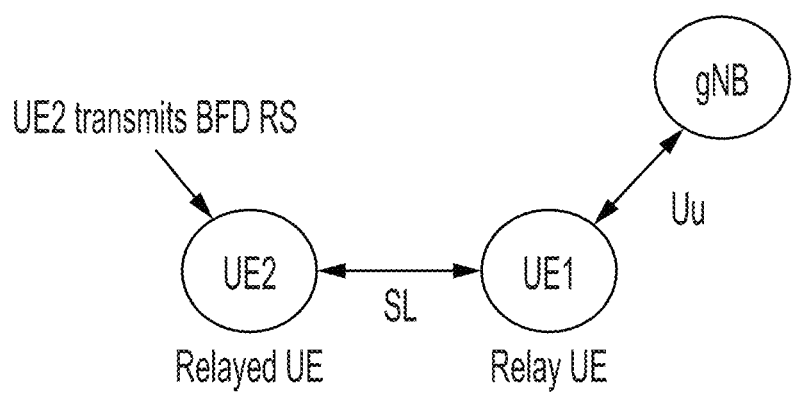
FIG. 12 is a block diagram illustrating a configuration for user equipments (UEs) transmitting and receiving beam failure detection (BFD) reference signals (RSs) in a relay environment, in accordance with aspects of the present disclosure.

FIG. 12 shows a scenario for a third option. FIG. 12 is a block diagram illustrating a configuration for user equipments (UEs) transmitting and receiving beam failure detection (BFD) reference signals (RSs) in a relay environment, in accordance with aspects of the present disclosure. In the third option, the relayed UE transmits the BFD reference signal and the relay UE receives the BFD reference signal. The relay UE relays the uplink traffic from the relayed UE to the base station, and downlink traffic from the base station to the relayed UE. In the example shown in FIG. 12, UE1 is a relay node communicating with a base station (e.g., gNB) via an access link (uU connection). UE1 also communicates with UE2 via a sidelink. In this example, UE1 is a relay UE and UE2 is a relayed UE. According to the third option, UE2 transmits the BFD reference signal and UE1 receives the BFD reference signal. If there is a beam failure, the relay UE may directly inform the gNB. In other aspects, the base station receives, from UE2 an indication of a sidelink beam failure. The base station reports the indication to UE1 and may also stop the downlink and uplink traffic to and from UE2

According to further aspects of the present disclosure, the BFD reference signals (e.g., slTxRadioLinkMonitoringRS and slRxRadioLinkMonitoringRS) may be configured based on physical sidelink shared channel (PSCCH) transmit and receive beams. For example, the UE1 BFD transmit reference signal (e.g., slTxRadioLinkMonitoringRS) may be configured based on the PSCCH transmit beams (e.g., for UE1 to transmit control information to UE2) and PSCCH receive beams (e.g., for UE1 to receive control information from UE2). The UE2 BFD receive reference signal (e.g., slRxRadioLinkMonitoringRS) may be configured based on the PSCCH transmit beams (e.g., for UE2 to transmit control information to the UE1) and PSCCH receive beams (e.g., for UE2 to receive control information from UE1).

As indicated above, FIGS. 7-12 are provided as examples. Other examples may differ from what is described with respect to FIGS. 7-12.

Figure 13:
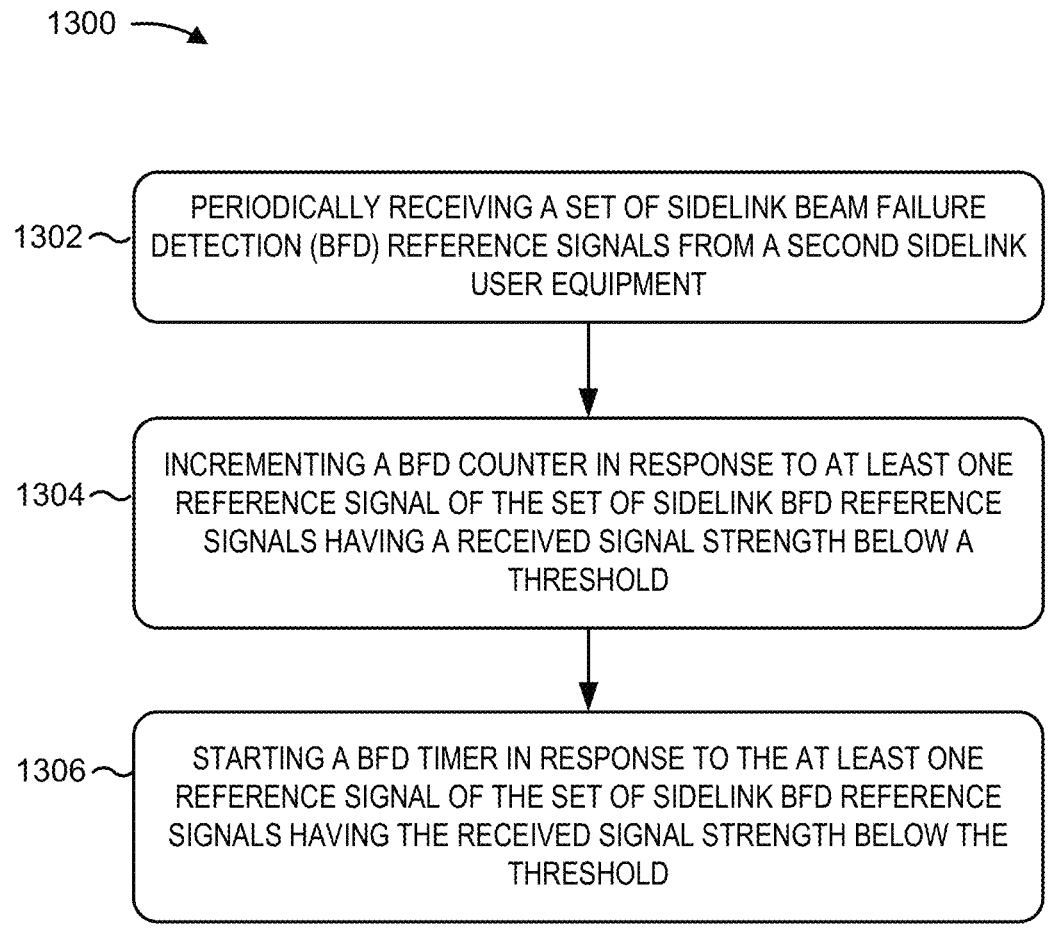
FIG. 13 is a flow diagram illustrating an example process performed, for example, by a sidelink user equipment, in accordance with various aspects of the present disclosure.

FIG. 13 is a flow diagram illustrating an example process 1300 performed, for example, by a sidelink user equipment, in accordance with the various aspects of the present disclosure. The example process 1300 is an example of directional sidelink beam failure detection. In some aspects, the process 1300 may include periodically receiving a set of sidelink beam failure detection (BFD) reference signals (RSs) from a second sidelink UE (block 1302). For example, the UE (e.g., using the antenna 352, RX/TX 354, RX processor 356, controller/processor 359, and/or memory 360) may periodically receive the BFD RSs. In some aspects, the UE may periodically transition to a transmitting role to transmit a second set of sidelink beam failure detection reference signals (RSs).

The process 1300 may include incrementing a beam failure detection (BFD) counter in response to at least one reference signal of the set of sidelink beam failure detection RSs having a received signal strength below a threshold (block 1304). For example, the UE (e.g., using the controller/processor 359 and/or memory 360) may increment the counter. The UE may reset the beam failure detection counter by setting the beam failure detection counter to zero, in response to a beam failure detection timer expiring without declaring beam failure.

In some aspects, the process 1300 may include starting the beam failure detection timer in response to the at least one reference signal of the set of sidelink beam failure detection reference signals having the received signal strength below the threshold (block 1306). For example, the UE (e.g., using the controller/processor 359 and/or memory 360) may start the timer. In some aspects, the beam failure detection timer has not started before the signal strength is below the threshold. The UE may declare beam failure in response to the beam failure detection counter reaching a maximum value before the beam failure detection timer expires. The UE may also start a beam failure recovery process in response to declaring beam failure. In other aspects, the UE may reset the beam failure detection timer by stopping the timer and setting the timer to zero, in response to the beam failure detection timer expiring without declaring beam failure.

Figure 14:
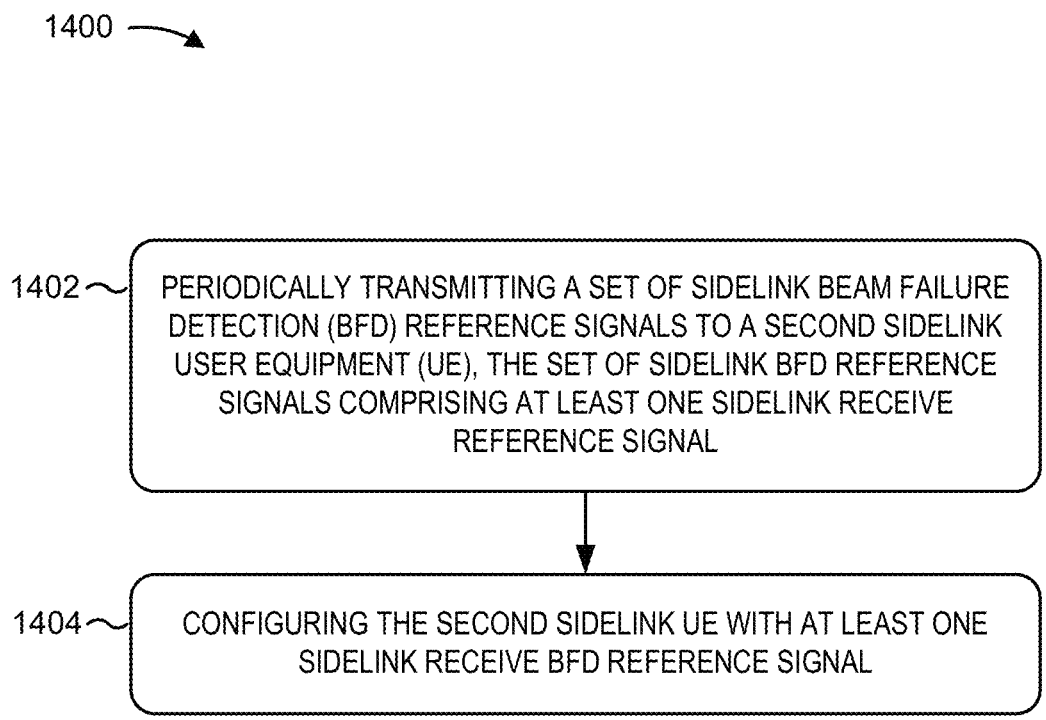
FIG. 14 is a flow diagram illustrating an example process performed, for example, by a sidelink user equipment, in accordance with various aspects of the present disclosure.

FIG. 14 is a flow diagram illustrating an example process 1400 performed, for example, by a sidelink user equipment, in accordance with the various aspects of the present disclosure. The example process 1400 is an example of directional sidelink beam failure detection.

In some aspects, the process 1400 may include periodically transmitting a set of sidelink beam failure detection reference signals (RSs) to a second sidelink UE, the set of sidelink beam failure detection reference signals comprising at least one sidelink receive reference signal (block 1402). For example, the UE (e.g., using the antenna 352, RX/TX 354, TX processor 368, controller/processor 359, and/or memory 360) may transmit the BFR RSs. The set of beam failure detection reference signals may include a sidelink synchronization signal block (SL SSB) reference signal and/or a sidelink channel state information reference signal (SL CSI-RS).

In some aspects, the process 1400 may include configuring the second sidelink UE with at least one sidelink receive beam failure detection reference signal (block 1404). For example, the UE (e.g., using the antenna 352, RX/TX 354, TX processor 368, controller/processor 359, and/or memory 360) may configure the second sidelink UE with a beam failure detection timer expiration value and/or a maximum beam failure detection counter value.

Figure 15:
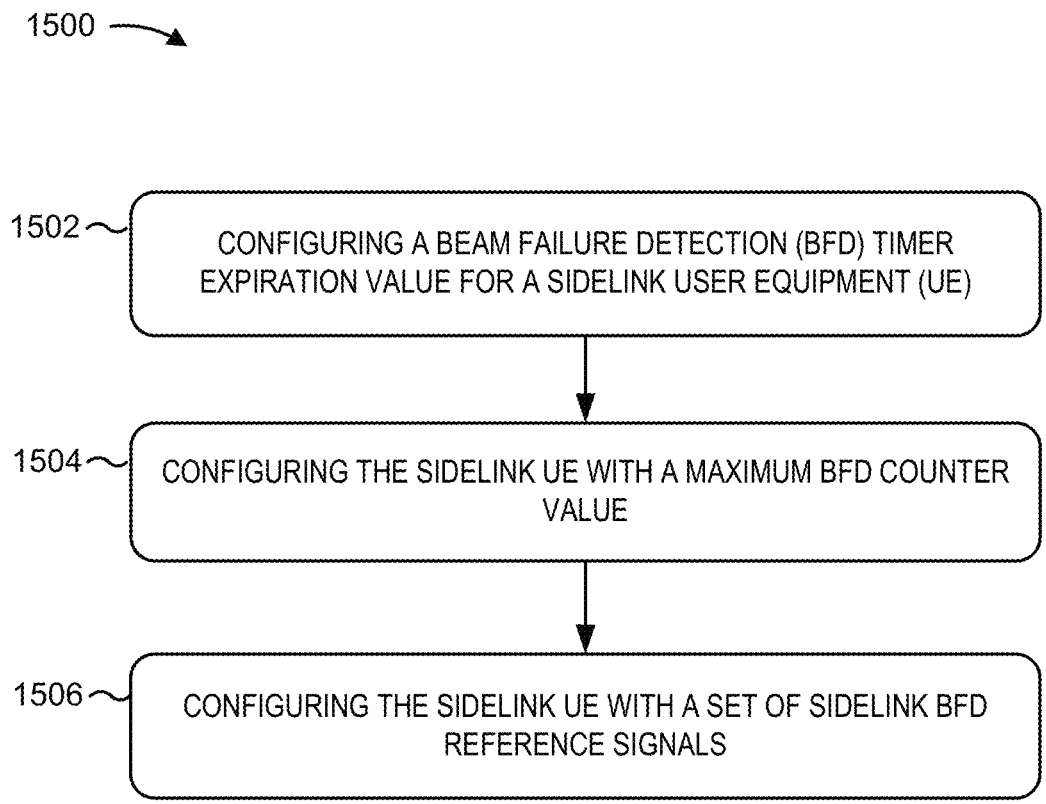
FIG. 15 is a flow diagram illustrating an example process performed, for example, by a base station, in accordance with various aspects of the present disclosure.

FIG. 15 is a flow diagram illustrating an example process 1500 performed, for example, by a base station, in accordance with the various aspects of the present disclosure. The example process 1500 is an example of directional sidelink beam failure detection. In some aspects, the process 1500 may include configuring a beam failure detection (BFD) timer expiration value for a sidelink user equipment (UE) (block 1502). For example, the base station (e.g., using the antenna 320, RX/TX 318, TX processor 316, controller/processor 375, and/or memory 376) may configure the BFD timer expiration value. In some aspects, the process 1500 may include configuring the sidelink UE with a maximum BFD counter value (block 1504). For example, the base station (e.g., using the antenna 320, RX/TX 318, TX processor 316, controller/processor 375, and/or memory 376) may configure the maximum BFD counter value. In some aspects, the process 1500 may include configuring the sidelink UE with a set of sidelink BFD reference signals (block 1506). For example, the base station (e.g., using the antenna 320, RX/TX 318, TX processor 316, controller/processor 375, and/or memory 376) may configure the set of BFD reference signals.

Figure 16:
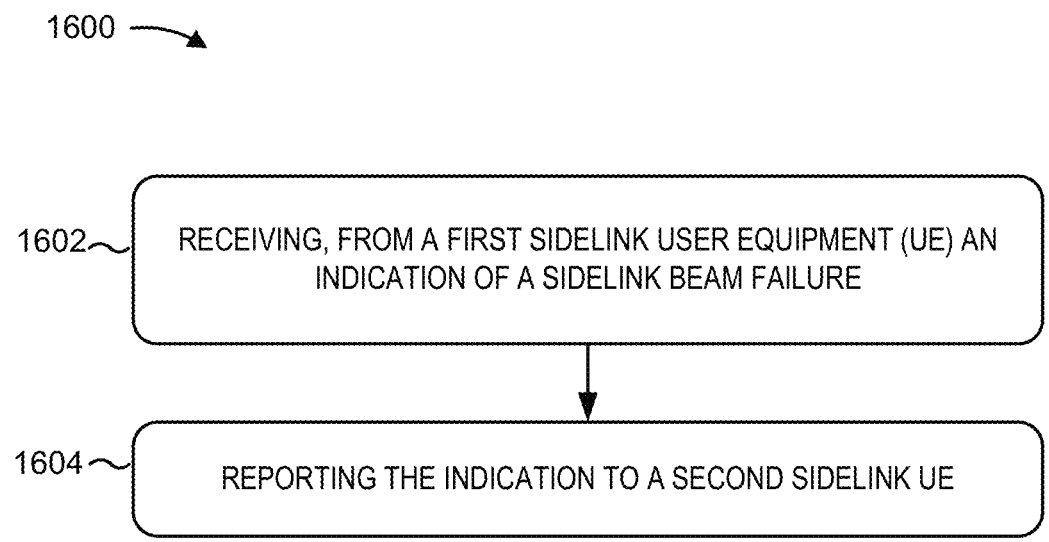
FIG. 16 is a flow diagram illustrating an example process performed, for example, by a base station, in accordance with various aspects of the present disclosure.

FIG. 16 is a flow diagram illustrating an example process 1600 performed, for example, by a base station, in accordance with the various aspects of the present disclosure. The example process 1600 is an example of directional sidelink beam failure detection. In some aspects, the process 1600 may include receiving, from a first sidelink user equipment (UE) an indication of a sidelink beam failure (block 1602). For example, the base station (e.g., using the antenna 320, RX/TX 318, RX processor 370, controller/processor 375, and/or memory 376) receives the indication. The process 1600 may also include reporting the indication to a second sidelink UE (block 1604). For example, the base station (e.g., using the antenna 320, RX/TX 318, TX processor 316, controller/processor 375, and/or memory 376) reports the indication.

Implementation examples are described in the following numbered clauses.

1. A method of wireless communication by a first sidelink user equipment (UE), comprising:
    periodically receiving a set of sidelink beam failure detection (BFD) reference signals (RSs) from a second sidelink UE;
    incrementing a beam failure detection counter in response to at least one reference signal of the set of sidelink beam failure detection reference signals having a received signal strength below a threshold; and
    starting a beam failure detection timer in response to the at least one reference signal of the set of sidelink beam failure detection reference signals having the received signal strength below the threshold.

2. The method of clause 1, further comprising starting the beam failure detection timer in response to the at least one reference signal of the set of sidelink beam failure detection reference signals having the received signal strength below the threshold, wherein the beam failure detection timer has not started before the signal strength is below the threshold.
3. The method of clause 1 or 2, further comprising:
  resetting the beam failure detection counter by setting the beam failure detection counter to zero, in response to the beam failure detection timer expiring without declaring beam failure; and
  resetting the beam failure detection timer by stopping the timer and setting the timer to zero, in response to the beam failure detection timer expiring without declaring beam failure.
4. The method of any of the preceding clauses, further comprising:
  declaring beam failure in response to the beam failure detection counter reaching a maximum value before the beam failure detection timer expires; and
  starting a beam failure recovery process in response to declaring beam failure.
5. The method of any of the preceding clauses, in which the set of sidelink beam failure detection reference signals comprise a sidelink synchronization signal block (SL SSB) reference signal.
6. The method of any of the preceding clauses, in which the set of sidelink beam failure detection reference signals comprise a sidelink channel state information reference signal (SL CSI-RS).
7. The method of any of the preceding clauses, further comprising receiving, from the second sidelink UE or a base station, information conveying a beam failure detection timer expiration value.
8. The method of any of the preceding clauses, further comprising receiving, from the second sidelink UE or a base station, information conveying a maximum beam failure detection counter value.
9. The method of any of the preceding clauses, further comprising receiving, from the second sidelink UE or a base station, a configuration for the set of sidelink beam failure detection reference signals.
10. The method of any of the preceding clauses, further comprising adjusting at least one receive beam for receiving the set of sidelink beam failure detection reference signals by selecting a different beam.
11. The method of any of the preceding clauses, further comprising indicating the adjusting to the second sidelink UE.
12. The method of any of the preceding clauses, further comprising periodically transitioning to a transmitting role to transmit a second set of sidelink beam failure detection reference signals (RSs).
13. The method of any of the preceding clauses, further comprising declaring a beam failure before the beam failure detection counter reaches a maximum value, prior to transmitting the second set of sidelink beam failure detection reference signals.
14. The method of any of the preceding clauses, in which the first sidelink UE is a relay UE.
15. The method of any of the preceding clauses, further comprising informing a base station of a beam failure.
16. The method of any of the preceding clauses, further comprising configuring receive beams for the set of sidelink beam failure detection reference signals based on physical sidelink control channel (PSCCH) transmit beams and PSCCH receive beams.
17. A method of wireless communication by a first sidelink user equipment (UE), comprising:
  periodically transmitting a set of sidelink beam failure detection reference signals (RSs) to a second sidelink UE, the set of sidelink beam failure detection reference signals comprising at least one sidelink receive reference signal; and
  configuring the second sidelink UE with at least one sidelink receive beam failure detection reference signal.
18. The method of clause 17, further comprising configuring the second sidelink UE with a beam failure detection timer expiration value.
19. The method of clause 17 or 18, further comprising configuring the second sidelink UE with a maximum beam failure detection counter value.
20. The method of any of the clauses 17-19, in which the set of beam failure detection reference signals comprises a sidelink synchronization signal block (SL SSB) reference signal.
21. The method of any of the clauses 17-20, in which the set of beam failure detection reference signals comprises a sidelink channel state information reference signal (SL CSI-RS).
22. The method of any of the clauses 17-21, further comprising:
  receiving an indication, from the second sidelink UE, of a changed receive beam for the at least one sidelink receive beam failure detection reference signal; and
  updating a transmit beam for the at least one sidelink transmit beam failure detection reference signal.
23. The method of any of the clauses 17-22, in which the first sidelink UE is a relayed UE.
24. The method of any of the clauses 17-23, further comprising configuring the at least one sidelink transmit beam failure detection reference signal based on at least one physical sidelink control channel (PSCCH) transmit beam and at least one PSCCH receive beam.
25. The method of any of the clauses 17-24, further comprising periodically transitioning to a receiving role to monitor for a second set of beam failure detection reference signals (RSs).

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a first sidelink user equipment (UE), comprising:
   periodically receiving a first set of sidelink beam failure detection (BFD) reference signals (RSs) from a second sidelink UE, the first set comprising a plurality of reference signals;
   incrementing a beam failure detection counter in response to all of the reference signals of the first set of sidelink beam failure detection reference signals having a received signal strength below a threshold;
   starting a beam failure detection timer in response to the first set of sidelink beam failure detection reference signals having the received signal strength below the threshold;
   declaring a beam failure before the beam failure detection counter reaches a maximum beam failure detection counter value, prior to transmitting a second set of sidelink beam failure detection reference signals, in response to transitioning to a transmitting role to transmit the second set of sidelink beam failure detection reference signals (RSs).

2. The method of claim 1, further comprising starting the beam failure detection timer in response to the first set of sidelink beam failure detection reference signals having the received signal strength below the threshold, the beam failure detection timer not having started before the signal strength is below the threshold.

3. The method of claim 1, further comprising:
   resetting the beam failure detection counter by setting the beam failure detection counter to zero in response to the beam failure detection timer expiring without declaring beam failure; and
   resetting the beam failure detection timer by stopping the timer and setting the timer to zero in response to the beam failure detection timer expiring without declaring beam failure.

4. The method of claim 1, further comprising:
   starting a beam failure recovery process in response to declaring beam failure.

5. The method of claim 1, wherein the first set of sidelink beam failure detection reference signals comprise a sidelink synchronization signal block (SL SSB) reference signal.

6. The method of claim 1, wherein the first set of sidelink beam failure detection reference signals comprise a sidelink channel state information reference signal (SL CSI-RS).

7. The method of claim 1, further comprising receiving, from the second sidelink UE or a base station, information conveying a beam failure detection timer expiration value.

8. The method of claim 1, further comprising receiving, from the second sidelink UE or a base station, information conveying the maximum beam failure detection counter value.

9. The method of claim 1, further comprising receiving, from the second sidelink UE or a base station, a configuration for the first set of sidelink beam failure detection reference signals.

10. The method of claim 1, further comprising adjusting at least one receive beam for receiving the first set of sidelink beam failure detection reference signals by selecting a different beam.

11. The method of claim 10, further comprising indicating the adjusting to the second sidelink UE.

12. The method of claim 1, wherein the first sidelink UE is a relay UE.

13. The method of claim 12, further comprising informing a base station of a beam failure.

14. The method of claim 1, further comprising configuring receive beams for the first set of sidelink beam failure detection reference signals in accordance with physical sidelink control channel (PSCCH) transmit beams and PSCCH receive beams.

15. A method of wireless communication by a first sidelink user equipment (UE), comprising:
   periodically transmitting a first set of sidelink beam failure detection reference signals (RSs) to a second sidelink UE, the first set of sidelink beam failure detection reference signals comprising a first type of reference signal for a first beam and a second type of reference signal for a second beam;
   receiving a beam failure indication from the second UE prior to a beam failure detection counter at the second UE reaching a maximum beam failure detection counter value before a beam failure detection timer expires; and
   periodically transitioning to a receiving role to monitor for a second set of beam failure detection reference signals (RSs).

16. The method of claim 15, further comprising configuring the second sidelink UE with a beam failure detection timer expiration value.

17. The method of claim 15, further comprising configuring the second sidelink UE with the maximum beam failure detection counter value.

18. The method of claim 15, wherein the first type of reference signal comprises a sidelink synchronization signal block (SL SSB) reference signal.

19. The method of claim 15, wherein the second type of reference signal comprises a sidelink channel state information reference signal (SL CSI-RS).

20. The method of claim 15, further comprising:
   receiving an indication, from the second sidelink UE, of a changed receive beam for at least one sidelink beam failure detection reference signal; and updating a transmit beam for the at least one sidelink beam failure detection reference signal.

21. The method of claim 15, wherein the first sidelink UE is a relayed UE.

22. The method of claim 15, further comprising configuring at least one sidelink transmit beam failure detection reference signal in accordance with at least one physical sidelink control channel (PSCCH) transmit beam and at least one PSCCH receive beam.

* * * * *